United States Patent [19]
Williamson et al.

[11] Patent Number: 5,792,419
[45] Date of Patent: Aug. 11, 1998

[54] MECHANICALLY LOADED DIRECT AIR CIRCULATION COMMODITY DISINFESTATION CHAMBER

[75] Inventors: Michael Ronald Williamson; Paul Martin Winkleman, both of Honolulu, Hi.

[73] Assignee: University of Hawaii, Honolulu, Hi.

[21] Appl. No.: 825,408

[22] Filed: Mar. 27, 1997

Related U.S. Application Data

[63] Continuation of Ser. No. 589,586, Jan. 22, 1996, abandoned, which is a continuation of Ser. No. 123,519, Sep. 17, 1993, abandoned.

[51] Int. Cl.$^6$ .................... A61L 2/00; B01J 19/00
[52] U.S. Cl. .................... 472/1; 43/124; 422/28; 422/32; 422/40; 422/109; 426/419; 426/521
[58] Field of Search .................... 422/1, 28, 32, 422/40, 307, 308, 105, 108, 109; 426/419, 407, 521; 43/124

[56] References Cited

U.S. PATENT DOCUMENTS

| | | | |
|---|---|---|---|
| H828 | 10/1990 | Armstrong et al. | 426/615 |
| 969,969 | 9/1910 | Merrell . | |
| 2,095,455 | 10/1937 | Simonson | 99/271 |
| 2,978,333 | 4/1961 | Teigen | 426/419 |
| 3,518,949 | 7/1970 | Stock | 107/7 |
| 3,986,832 | 10/1976 | Smorenburg | 426/407 |
| 4,152,842 | 5/1979 | Laughlin | 34/196 |
| 4,196,225 | 4/1980 | Mencacci | 426/407 X |
| 4,201,916 | 5/1980 | Ellner | 250/372 |
| 4,336,456 | 6/1982 | Kuse et al. | 250/436 |
| 4,421,987 | 12/1983 | Herold | 250/492.1 |
| 4,457,292 | 7/1984 | Jorgensen et al. | 126/21 A |
| 4,503,333 | 3/1985 | Kulin et al. | 250/455.1 |
| 4,535,247 | 8/1985 | Kurtz | 250/436 |
| 4,572,427 | 2/1986 | Selfridge et al. | 236/3 |
| 4,618,497 | 10/1986 | Couey et al. | 426/521 X |
| 4,621,195 | 11/1986 | Larsson | 250/438 |
| 4,676,152 | 6/1987 | Tsuji et al. | 99/468 |
| 4,689,303 | 8/1987 | Kraft et al. | 435/290 |
| 4,824,685 | 4/1989 | Bianco | 426/418 |
| 5,041,298 | 8/1991 | Wallace et al. | 426/419 X |
| 5,203,108 | 4/1993 | Washburn, Jr. | 43/124 X |
| 5,312,034 | 5/1994 | Nakagawa et al. | 426/419 X |

OTHER PUBLICATIONS

"Quality of High–Temperature Forced–Air Treated Papayas", Catherine G. Cavaletto, Proceedings: 25th Annual Hawaii Papaya Industry Association Conference, pp. 10–15, Sep. 29–30, 1989.

"Quality Evaluation of High–Temperature Forced–Air Treated Papayas", Catherine G. Cavaletto, Proceedings: 26th Annual Hawaii Papaya Industry Association Conference, pp. 10–12, Sep. 28–29, 1990.

(List continued on next page.)

*Primary Examiner*—Krisanne Thornton
*Attorney, Agent, or Firm*—Medlen & Carroll, LLP

[57] ABSTRACT

A disinfestation treatment chamber for treating fruit, flower and vegetable commodities subject to infestation by quarantine pests. The commodities are disinfested so as to meet quarantine restrictions without adversely affecting the quality of the commodity. The commodity is heated inside of the chamber in hot air having a relative humidity of 30–85% until the temperature of the commodity exceeds the thermal death point temperature of the target pest but is not so high as to adversely affect the quality of the commodity. The temperature of the commodity is held at this temperature until the pest is killed. The commodity is loaded into the treatment chamber in bins onto a low friction conveyor track system which transports the bins from one end of the chamber to the other. The commodities are treated while they are inside of the treatment chamber. After treatment of the commodities, the bins are unloaded using the low friction conveyor track system out of the opposite end of the treatment chamber. The chamber includes a fan/heat exchanger located inside the treatment chamber and positioned under the commodity bins. The space directly above the fan/heat exchanger is left unobstructed during treatment to enhance the airflow through the commodity bins.

8 Claims, 10 Drawing Sheets

OTHER PUBLICATIONS

"Quarantine Procedure for Hawaiian Papaya Using Fruit Selection and a Two-stage Hot-water Immersion", Couey & Hayes, Journal of Economic Entomology, 79:1307–1314 (1986).

APHIS, Plant Protection and Quarantine Treatment Manual, Section III, Part 9, Treatment Procedure, 1985.

APHIS, CFR Amendment No. 85–19, Part 318—Hawaiian and Territorial Quarantine Notices Jan. 1, 1992.

J.W. Armstrong et al., "High–Temperature, Forced–Air Quarantine Treatment for Papayas Infested with Tephtritid Fruit Flies (Diptera: Tephritidae)," *J. Econ. Entomol.*, 82(6):1667–74 Dec. 1989.

J.W. Armstrong, "High Temperature Forced–Air Quarantine Treatment for Papayas," *Proceedings: 23rd Annual Hawaii Papaya Industry Association Conference*, pp. 17–20, Sep. 1987.

J.W. Armstrong, "High Temperature Forced–Air Quarantine Treatments for Fresh Fruits Infested by Tephritid Fruit Flies," *Acta Horticulturae*, 269:449–51 (1990).

M.R. Williamson and P.M. Winkleman, "Commercial Scale Heat Treatment For Disinfestation of Papaya," *ASAE Paper No. 89–6054*, pp. 1–15 Jun. 1989.

P.M. Winkleman and M.R. Williamson, "Advances in Commercial Dry Heat Disinfestation of Papaya," *ASAE Paper No. 90–6016*, pp. 1–15 Jun. 1990.

M.R. Williamson et al., "Certification of Fruit Fly Disinfestation Chambers," *ASAE Paper No. 91–6569*, pp. 1–8 Dec. 1991.

J.L. Sharp et al., "Hot–Air Treatment Device for Quarantine Research," *J. Econ. Entomol.*, 84(2):520–27 Apr. 1991.

J.J. Gaffney, "Warm Air/Vapor Heat Research Facility for Heating Fruits for Insect Quarantine Treatments," *ASAE Paper No. 90–6615*, pp. 1–9 Dec. 1990.

J.J. Gaffney and J.W. Armstrong, "High–Temperature Forced–Air Research Facility for Heating Fruits for Insect Quarantine Treatments," *J. Econ. Entomol.*, 83(5):1959–64 Oct. 1990.

J.J. Gaffney, "Engineering Considerations of Heat Transfer in Quarantine Treatments for Fruits," *ARS Quantitative Workshop*, pp. 1–9, Nov. 1989.

J.J. Gaffney et al., "Vapor Heat Research Unit for Insect Quarantine Treatments," *J. Econ. Entomol.*, 83(5):1965–71 Oct. 1990.

J.J. Gaffney, "Engineering Principles Related to the Design of Systems for Air Cooling of Fruits and Vegetables in Shipping Containers," *Proceedings Twenty–Ninth International Conference on Handling Perishable Agricultural Commodities*, pp. 1–14 Sep. 1977.

A.H. Bennett et al., "A Prototype Commercial Forced–Air Precooler," *ARS*, 52–9:1–11 Dec. 1965.

C.E. Hood, "A Forced–Air Precooler for Pickling Cucumbers," *Food Technology*, 21(2):86–88 Feb. 1967.

C.D. Baird et al., "Research Facility for Forced–Air Precooling of Fruits and Vegetables," *Trans. of the ASAE*, 18(2):376–79 (1975).

R.V. Morey and J.P. Lang, "Experimental System for Field Cooling of Fresh Produce," *Applied Engineering in Agriculture*, 4(3):259–64 Sep. 1988.

SUBROUTINE DATAIN

FIG. 12

SUBROUTINE DATAOUT

FIG. 13

SUBROUTINE MENU

FIG. 14

SUBROUTINE PRINTINTERVAL

FIG. 15

MECHANICALLY LOADED DIRECT AIR CIRCULATION COMMODITY DISINFESTATION CHAMBER

This is a continuation of application Ser. No. 08/589,586 filed on Jan. 22, 1996 abandoned, which is a continuation of Ser. No. 08/123,519 filed on Sep. 17, 1993, now abandoned.

FIELD OF THE INVENTION

This invention relates to a postharvest disinfestation treatment chamber which is used to ensure that commodities such as fruits, flowers and vegetables are free of pests so as to meet quarantine requirements. More particularly, the present invention relates to heating the commodities with hot air under controlled conditions of relative humidity to kill all life stages of quarantine pests present in the commodity without adversely affecting the quality of the commodity.

BACKGROUND OF THE INVENTION

Certain pests are very destructive to agricultural commodities; thus quarantine restrictions are imposed to ensure that these pests are not disseminated by export of agricultural commodities which may harbor these pests to areas where the pests do not occur. Illustrative of such quarantine pests are tephritid fruit flies (Diptera: Tephritidae) such as the Mediterranean fruit fly, Ceratitis capitata (Wiedemann); the oriental fruit fly, Dacus dorsalis Hendel, and the melon fly, Dacus cucurbitae Coquillet. Fruit flies are among the most destructive insect pests of citrus, deciduous fruits, and vegetables. Tephritid fruit flies are present in Hawaii and have been shown to spread as larvae or eggs in fruits or vegetables shipped from infested areas. Agricultural commodities such as papayas, mangos, avocados, citrus, cucumbers, and bell peppers produced in Hawaii that may be infested with fruit flies cannot be shipped to the mainland U.S. or Japanese markets without quarantine treatment to ensure that the fruits or vegetables are free of fruit flies.

Prior to September, 1984, the standard treatment for papayas was fumigation with ethylene dibromide (EDB). Subsequent to the cancellation by the U.S. Environmental Protection Agency of the use of EDB as a food fumigant, the quarantine treatment that was adopted consisted of selecting papaya fruit of no more than quarter-ripeness as defined by color standard values measured with a colorimeter and then immersing the fruit in water at 42 degree(s) C. for 30 minutes followed immediately by a second immersion in water at 49 degree(s) C. for 20 minutes (Couey and Hayes, Journal of Economic Entomology, 79:1307–1314 (1986)). The hot-water immersions are used to destroy the fruit fly eggs and control postharvest decay. However, the complete treatment is limited because of the ripeness selection and because the water immersions are not sufficiently hot to kill fruit fly larvae inside the fruit. This treatment was deregistered as an approved method of quarantine treatment for papayas in 1991.

Another quarantine procedure, called the "vapor heat treatment", uses high-temperature water-saturated vapor to raise the pulp temperature of papaya to 44.4 degrees C. over a 6 to 8 hour period. The fruits are held at the temperature for 8.75 hours, then cooled immediately after the heating phase to below ambient temperature (APHIS, Plant Protection and Quarantine Treatment Manual, Section III, Part 9, Treatment Procedure, 1985). Although this procedure is effective against all fruit fly life stages, the treatment is time consuming and expensive. Also, scalding damage to the fruit may occur. A modified version of the vapor heat treatment, the "quick run-up treatment", requires heating papayas with saturated water vapor until the fruit center temperature reaches 47.2 degree(s) C., then immediately cooling the fruits (APHIS, CFR Amendment No. 85-19, Part 318—Hawaiian and Territorial Quarantine Notices). Although this method takes less time, elaborate facilities are still needed and some fruits may be damaged by vapor heat.

Another method of treating fruit for these infestations comprises heating a fruit or vegetable commodity in hot air under controlled conditions of relative humidity until the temperature of the commodity exceeds the thermal death point temperature of the pest but does not adversely affect the quality of the commodity. The commodity is held at this temperature until the pest is killed. Then, the commodity is cooled. This disinfestation treatment provides a replacement method to the prior art methods that use hot water or saturated water vapor and which have the disadvantages outlined above.

Using the hot air method, fruit and vegetable commodities subject to infestation by quarantine pests are disinfested so as to meet quarantine restrictions without adversely affecting the quality of the commodity. The method involves heating the commodity in hot air having a relative humidity of 30–80 percent until the temperature of the commodity exceeds the thermal death point temperature of the target pest, but is not so high as to adversely affect commodity quality. The temperature is held at this temperature until the pest is killed. The method is effective against all life stages of quarantine pests and is suitable for large-scale commercial disinfestation of commodities for movement through marketing channels, for example, for disinfestation of papayas of tephritid fruit flies such as the Mediterranean fruit fly, the melon fly and the oriental fruit fly.

Under controlled conditions this method does not adversely affect fruit and vegetable quality such as odor, taste, appearance, ripening, texture, shelf-life or other marketable traits of the commodity. Major agricultural commodities which can be treated by this method include, but are not limited to, fruits and vegetables such as papaya, mango, starfruit (carambola), atemoya, lychee, eggplant, green peppers, sweet peppers, hot peppers, cucumbers, avocado and squash.

Disinfestation chambers have been built which employ the different methods described above for killing various pests in different fruits and vegetables. One common chamber in use currently includes a fan, typically centrifugal, housed in its own chamber, separate from the commodity chamber. Such a chamber was taught by Tsuji et al. in U.S. Pat. No. 4,676,152. In the Tsuji chamber air is drawn in, heated by a heat exchanger, and then blown into the commodity chamber. Uniform airflow in such a chamber has proven difficult to maintain. The airflow can be reversed by the use of flow dampers. However, such dampers serve to further disrupt the airflow. The external positioning of the fan relative to the chamber creates heat and air flow losses, as well as temperature variations at different-locations within the chamber.

Another known method employs horizontal airflow through the chamber. In this type of chamber the fans or ducts are mounted on the side of the chamber and blow the air across the chamber horizontally. Horizontal airflow is not conducive to successfully treating commodities stored in bins.

SUMMARY OF THE INVENTION

A pest disinfestation chamber used to disinfest commodities before they are exported for resale, the commodities transported in bins, after harvest, the chamber comprising a conveyor track system for transporting bins of fruit or vegetables from a first end of the chamber to a second end of the chamber, the conveyor track system coupled to the chamber; and a means for heating and circulating air within the chamber and through the bins of commodities, the means for heating and circulating air coupled to the chamber and positioned inside of the chamber and under the bins of commodities. The conveyor track system includes a low friction track for transporting bins of fruit or vegetables from the first end of the chamber to a second end of the chamber. The bins are loaded onto the conveyor track system through a first set of end doors and unloaded off of the conveyor track system through a second set of end doors, the first and the second set of end doors providing a seal against the ends of the bins during treatment of the commodities. The second set of end doors opening into an insect-free zone. The means for heating and circulating air is comprised of an axial fan and heat exchanger. The means for heating and circulating air is comprised of a reversible fan and heat exchanger.

A treatment method for disinfesting a fruit, flower or vegetable commodity of a quarantine pest, which comprises the steps of: loading a plurality of bins, each bin full of a fruit, flower or vegetable commodity, into an interior of a disinfestation treatment chamber onto a low friction conveyor track system; heating the commodity inside of the plurality of bins in one or more stages with air having a temperature above the thermal death point temperature of a target pest, the air heated and circulated by a fan and heat exchanger positioned under the plurality of bins and inside the interior of the disinfestation treatment chamber; holding the commodity inside of the plurality of bins at this temperature until the target pest is killed; and unloading the plurality of bins from the interior of the disinfestation treatment chamber using the conveyor track system The treatment method further comprises the step of placing a temperature probe within the sampled fruit or commodity located in a cold spot in each stack or bin within the chamber and measuring the temperature of the cold spot to determine the temperature distribution of the chamber.

DESCRIPTION OF THE PRESENT INVENTION

The present invention is an improved, non-chemical disinfestation chamber. The chamber is intended to kill insect pests including fruit flies in various tropical commodities, such as papayas. The commodity can be contained in bins or stacked trays or baskets (all hereinafter referred to as commodity bins) which are loaded into the treatment chamber. Heated air is then forced through the commodity mass to raise its internal temperature above that required to kill all stages of the target insect.

The present invention uses a fan/heat exchanger assembly installed within the treatment chamber to circulate heated air through the commodity. Chambers of the prior art have positioned the fan(s) and heat exchanger(s) outside the treatment chamber, a practice which aggravates the problem of poor heat uniformity within the commodity mass and leads to insufficient or excessive heating. By contrast, the device of the present invention positions the fan assembly inside the treatment chamber, directly below the track supporting the commodity bins. This placement is intended to reduce heat losses and to promote uniform temperature distribution within the commodity. Given the narrow window between the temperature required to kill the insect and the temperature which damages the commodity, uniformity is very important to successful commercial operation.

The temperatures required to kill insects will vary depending on the type of insect targeted. The temperature which cannot be exceeded without damaging the commodity also varies depending on the type of commodity to be treated. To illustrate an example of the narrow window that the chamber of the present invention must operate within, the temperature necessary to kill a fruit fly is 47.2° C. and the temperature that cannot be exceeded without damaging a papaya is 48.5° C. Although the temperature at which damage to the commodity occurs, varies according to fruit type, season and weather conditions, papayas are particularly susceptible to heat damage at temperatures above 48.5° C.

The chamber of the present invention has spaces above and below the bins which form the plenums for air flow. The commodity bins rest upon an airtight low friction track as well as against a vertical side of the low friction track forcing the heated air, flowing from the fan, to pass through the commodity mass within the bins before recirculation back to the fan. Other prior art chambers use rollers to support and transport the bins through the chamber. The rollers allow air to leak past the bins and bypass the commodity in the bins. In contrast to the prior art, the low friction track of the present invention prevents air leakage around the bins and thereby controls proper air flow throughout the chamber.

DETAILED DESCRIPTION OF THE PREFERRED EMBODIMENT

Figure 1:
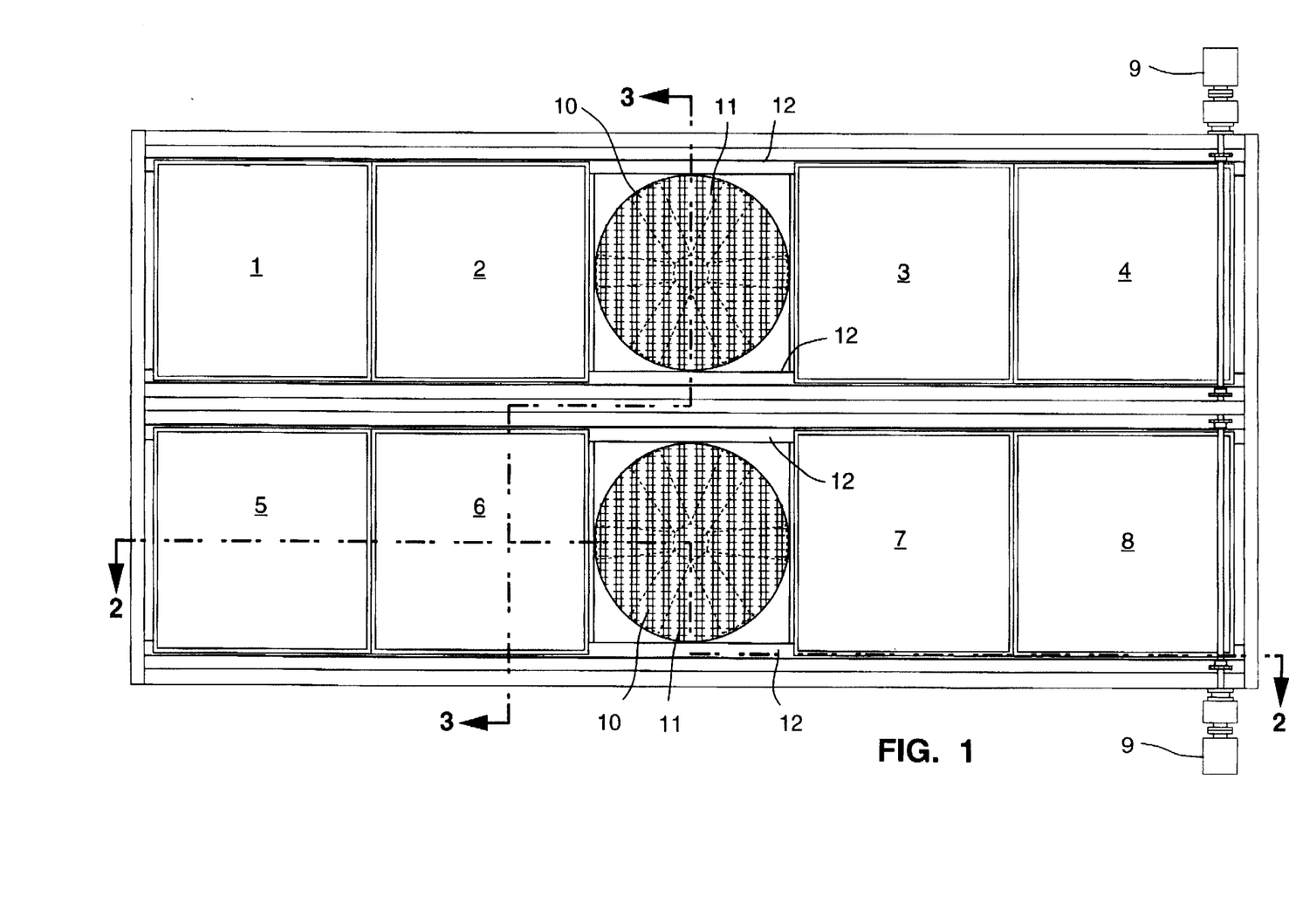
FIG. 1 illustrates a floor plan of the present invention showing the general arrangement of the commodity bins and the fan/heat exchangers on both sides.
Figure 2:
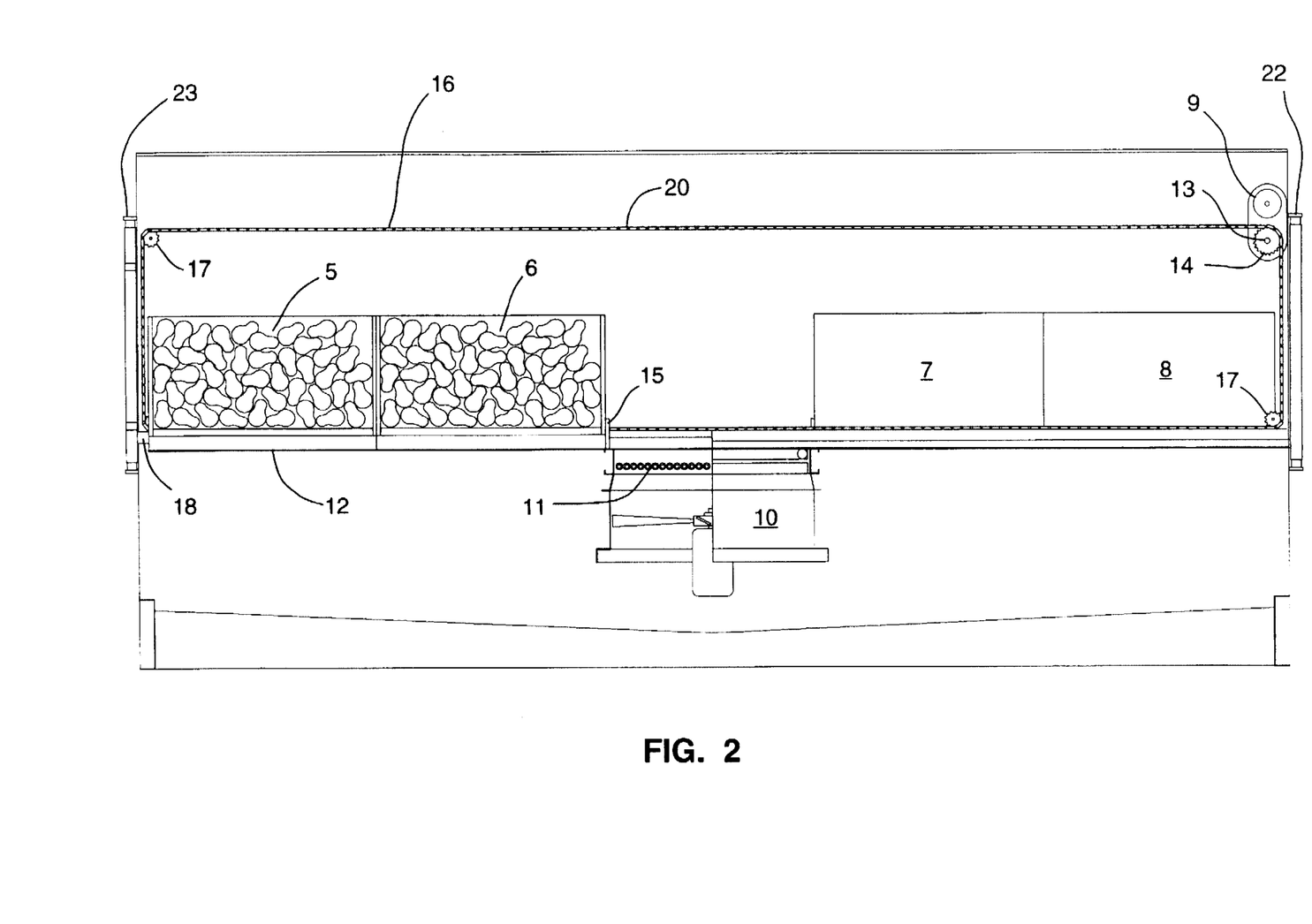
FIG. 2 illustrates a cut away side section of the present invention showing the arrangement of the fan/heat exchanger assembly, commodity bins and the conveyor system.
Figure 3:
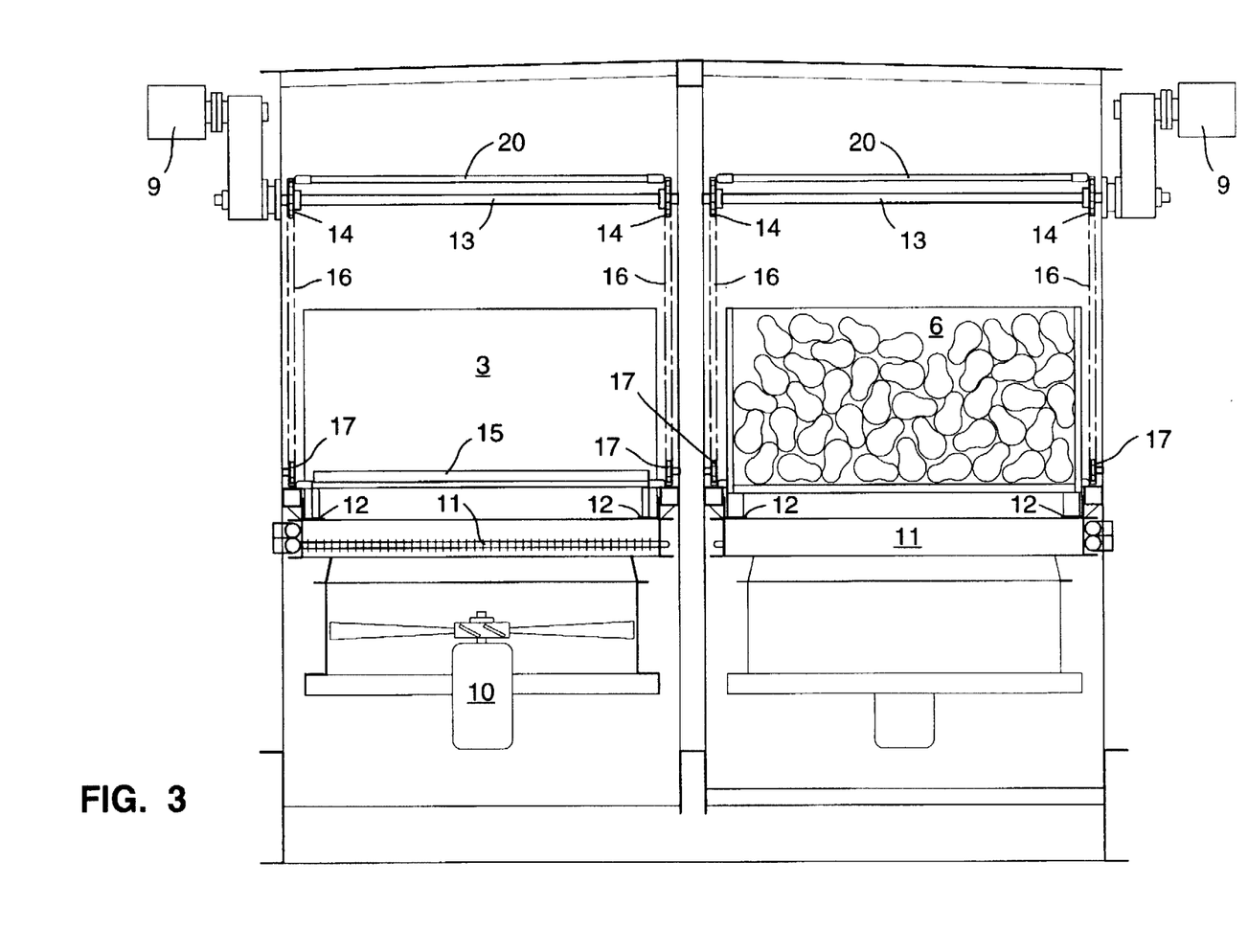
FIG. 3 illustrates a cut away end section of the present invention showing the sealing plates of the conveyor system and the track.

A floor plan of the disinfestation chamber of the present invention is illustrated in FIG. 1, a side section is presented in FIG. 2 and an end section in FIG. 3. The chamber of the present invention includes two identical rows of four commodity bins each. The drawing of FIG. 1 shows the floor plan arrangement of the commodity bins 1 through 8 and the fan/heat exchanger assemblies 10 and 11. The two sides of the treatment chamber are identical and each side has the capacity to hold four commodity bins. Each side has a door 22 and 23 located at each end, opening outward to allow commodity bins to be loaded and unloaded. The commodity bins are loaded into the treatment chamber at one end, positioned by the conveyor system for treatment and, following treatment, unloaded through the door at the opposite end, forming a flow through process in the treatment chamber.

Figure 4:
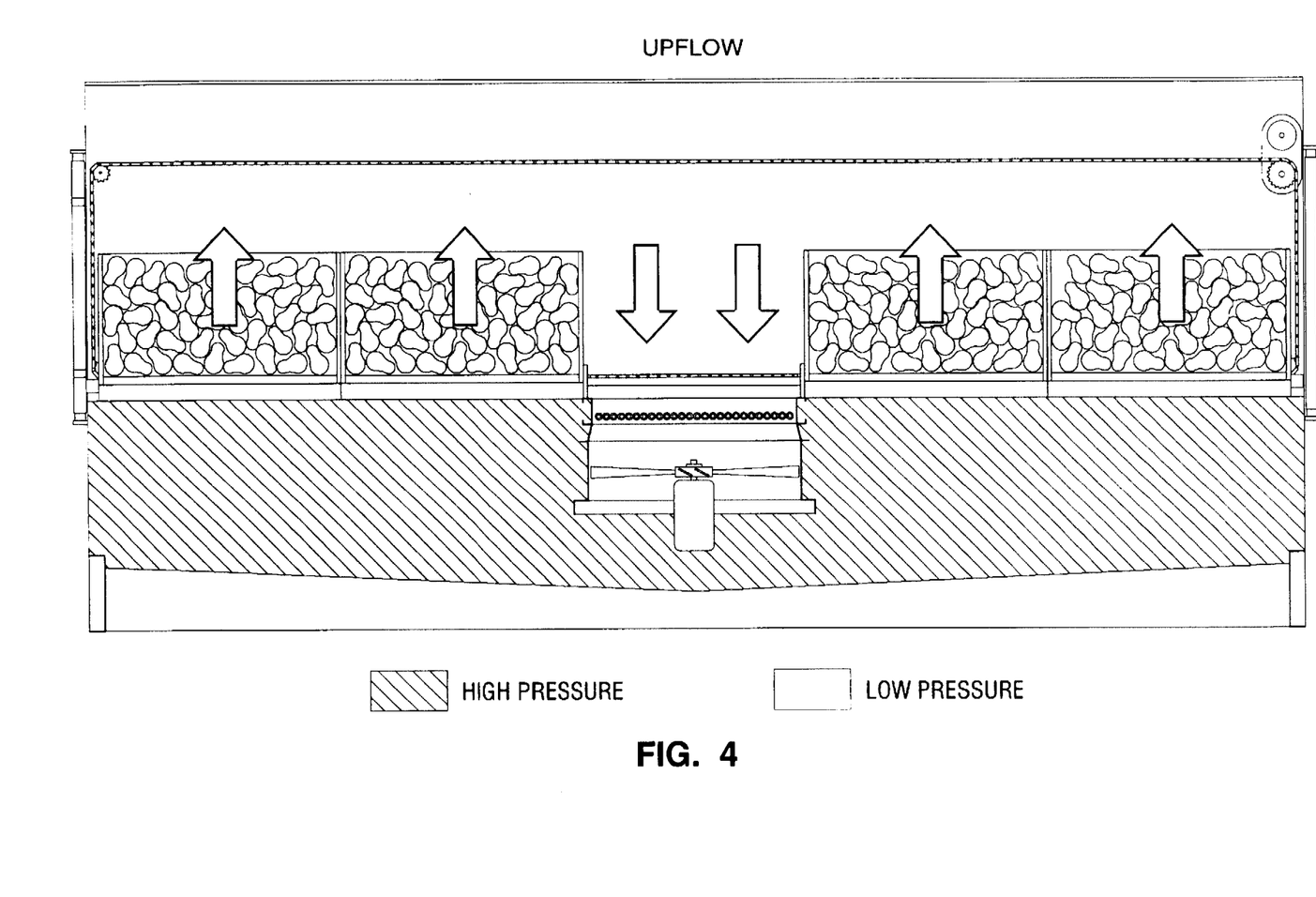
FIG. 4 illustrates the air flow path of the present invention when the high pressure air is in the bottom plenum and the air flows from the bottom of the commodity bins, through the perforated commodity bin floors, through the commodity and exiting from the top.
Figure 5:
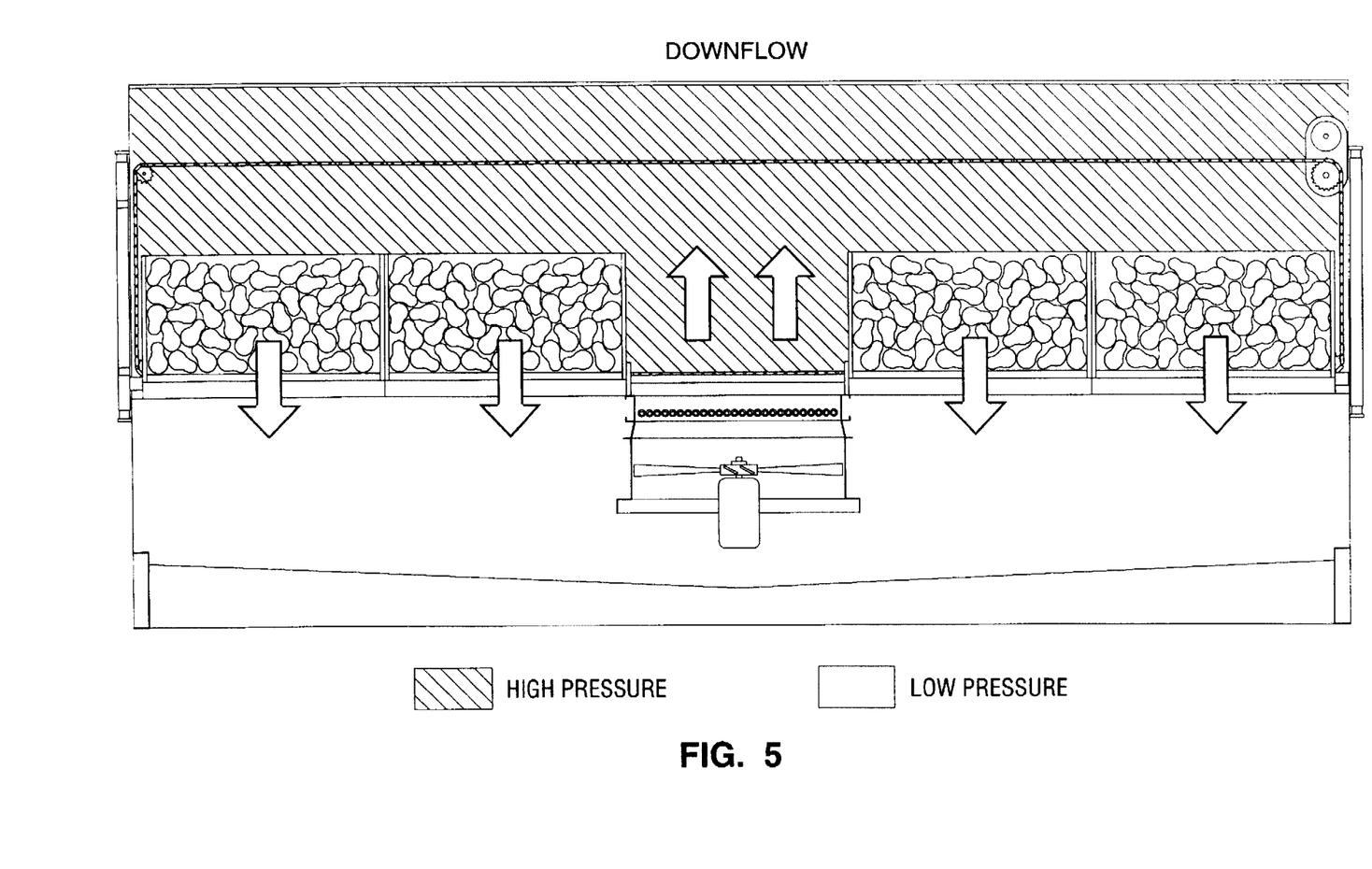
FIG. 5 illustrates the air flow path of the present invention when the high pressure air is in the top plenum and the air flows from the top of the commodity bins, through the commodity, through the perforated commodity bin floors and exiting from the bottom.

The fan 10 forces air through the heat exchanger 11 into one plenum, depending on the fan's direction of rotation, through the commodity into a return plenum and back to the fan. Thus, one plenum has higher air pressure and the other plenum has low air pressure. The commodity forms one path between the upper and lower plenums while the fan/heat exchanger 10 and 11 forms the return path. The air is forced through the commodity due to the difference in air pressure between the two plenums. The fan 10 can be chosen to include the capability to reverse its direction of rotation allowing air to be forced upward through the commodity, as illustrated in FIG. 4, or downward through the commodity, as illustrated in FIG. 5, thus promoting uniform heating within the commodity mass.

The fan/heat exchanger assembly 10 and 11 circulates the air throughout the chamber. The fan/heat exchanger assembly 10 and 11 is placed immediately below the bin track 12 to allow unimpeded loading and unloading of the commodity bins into and out of the treatment chamber. During treatment the space directly above the fan/heat exchanger assembly is not taken up by a commodity bin and forms part of the upper plenum.

The conveyor is utilized for both loading and unloading of the commodity bins. Each chamber side has its own independent conveyor system. The conveyor system is composed of two parallel bin tracks 12 lined with a low-friction material, two chain loops 16, two fan sealing plates 15, a push rod 20, six idler sprockets 17, two drive sprockets 14, a drive shaft 13 and a gear reduction motor 9. Loading the empty chamber is accomplished by positioning the fan sealing plate 15 near the drive shaft 13, loading the commodity bins 8 and 7 on the bin track through the end door 23 and partially pushing the commodity bins 8 and 7 into the chamber using a forklift. The gear reduction motor 9 is activated by pulling a switch and stops automatically when the commodity bin 7, pushed by the fan sealing plate 15, is immediately beyond the fan/heat exchanger assembly 10 and 11. The commodity bins 6 and 5 are subsequently loaded with a forklift. The commodity bin 6 is prevented from being pushed over the fan/heat exchanger assembly 10 and 11 by a second fan sealing plate.

During treatment, the end doors 22 and 23 are closed and sealed and only the air trapped inside the chamber is heated and circulated within the chamber. No air from outside the chamber is pulled into the chamber and no air from within the chamber is released out of the chamber during treatment of the commodity.

After treatment, the commodity bin 8 is unloaded by a forklift through the end door 22. After the commodity bin 8 is unloaded the commodity bin 7 is pushed to the end door 22 by the fan sealing plate 15 where it stops automatically. The commodity bins 6 and 5 are pushed passed the fan/heat exchanger assembly 10 and 11, into a position to be unloaded, using the push rod 20.

In the treatment chambers of the prior art, the commodity bins are loaded onto rollers inside the chamber, and pushed into position by hand or by the forklift or a hydraulic ram successively pushing the bins inward. The commodity bins are unloaded by workers pulling them out by hand or by a forklift using a hook on the end of a piece of rope. The hook must be attached to each bin by a worker who crawls into the chamber. By contrast, in the present invention the commodity bins are also unloaded off of the conveyor track system by a forklift driver who merely has to activate a switch from his driver's seat to position the next bin so that it is ready to lift off of the bin track. For example, the forklift driver can pull the commodity bin 8 out after treatment. The forklift driver can then activate the gear reduction motor 9 from his seat, by using any known remote control device, which will then automatically position the commodity bin 7 at the opening of the end door 23. After unloading the commodity bin 7, the commodity bins 6 and 5 can then be positioned by again activating the gear reduction motor 9 which uses the push rod 20 to position the commodity bins 6 and 5, so that they are ready for unloading.

The conveyor system is important in providing an air seal between the upper and lower plenums, ensuring that all the air is forced through the commodity rather than bypassing it. The bin track 12 is comprised of a low friction material covering a steel support member connected to the chamber wall. The low friction material forms an air seal between the sides of the commodity bins and the chamber walls. Compressible padding on the inside of both of the end doors 22 and 23 compresses against the outside commodity bins 5 and 8, forming a seal to prevent air leakage between the outer commodity bins and the end doors. The fan sealing plates 15 which extend upward from the bin track 12 prevent air leakage between the end of the inner commodity bins 6 and 7 and the fan/heat exchanger assembly 10 and 11.

The use of rollers to facilitate the chamber loading process, as used in treatment chambers of the prior art, creates difficulties in achieving a good air seal between the bins and the chamber walls. A good air seal between the bins and the chamber walls will ensure that the heating air does not bypass the commodity. One method used in the prior art to alleviate such difficulties consisted of positioning sealing material on the side of the chamber walls, relying on compression of the sealing material by the commodity bins to maintain the air seal. However, this method has drawbacks because the sealing material impedes the loading and unloading of the bins and will be worn away, over time by the friction of the passing bins.

The placement of the fan/heat exchanger assembly 10 and 11 inside the treatment chamber eliminates the heat losses and airflow inefficiencies prevalent in the chambers of the prior art which employ fan(s) and heat exchanger(s) external to the treatment chamber. The interior placement of the fan/heat exchanger assembly 10 and 11 also serves to minimize the variations of the temperature distribution between the commodity bins and within the commodity in the commodity bins.

The design of the chamber of the present invention also does not use any ducts to circulate the air within the chamber. The ductless construction of the chamber lowers the construction and operating costs and increases the efficiency of the chamber. The commodities themselves, stored in the bins, along with the plenums above and below the fruit, provide the return passage for the airflow.

The fan/heat exchanger assembly 10 and 11 can be of any known type of fan and heat exchanger, including but not limited to centrifugal, axial or reversible. The fan of the preferred embodiment is both axial and reversible allowing the air flow within the chamber to be reversed.

During treatment of the commodities, the chamber of the present invention is controlled by a computer which monitors the temperature inside the chamber and can increase or decrease the temperature as needed. A plurality of temperature probes are inserted into commodity samples distributed within each commodity bin inside the chamber into spots within the chamber which take the longest elapsed time to reach the fruit center kill temperature called "cold spots." The cold spots within each chamber are determined during a certification process in which a relatively large number of commodity probes are distributed throughout the chamber and monitored by a plurality of computers. These computers then record the temperature of each probe over the treatment period to identify the location of the cold spots within the chamber.

After the cold spots are determined, during regular operation of the treatment chamber, a limited number of temperature probes are inserted into the center of fruit and placed at the cold spots, usually one probe per commodity bin. The temperature measured by each of these probes is then monitored by the computer to indicate when quarantine conditions have been satisfied. During treatment, the air within the chamber is gradually heated up to a temperature in the range of 48.5° C. to 48.7° C. causing the center of the fruit to heat up slowly to a temperature of 47.2° C. Once the center of the fruit reaches this temperature the insect is considered to be exterminated and the fruit is then cooled to ambient temperature. To avoid potential damage to the commercial qualities of the fruit the center of the fruit should not be heated to a temperature exceeding 48.5° C. In order to reduce the risk of not exceeding a possible damage temperature of 48.5° C., the uniformity of the air temperature within the bins of the present invention is required. If the temperature of the fruit at the cold spot varies greatly from the temperature of other fruit in the bin, then it is possible that while the fruit at the cold spot has not yet reached the insect death point temperature, fruit that is not at the cold spot will have exceeded the suspected damage temperature of 48.5° C. and will be damaged. The chamber of the present invention is designed to create uniformity of temperature throughout the chamber and minimize the loss of fruit from overheating.

The time for treatment in the chamber of the present invention is approximately four to five hours for papayas. During the first three hours of this treatment the relative humidity of the air inside the chamber is kept in the range of 60–70 percent. During the last hour of the treatment the relative humidity of the air inside the chamber is raised to 85 percent.

The chamber of the present invention is designed to be installed at a packing house, where the commodities are brought in from the fields, after picking. The chamber can be installed in the middle of the packing house with a wall built over the chamber separating the area where the chamber is loaded from the area where the chamber is unloaded. The wall is used to form a barrier between a insect-free zone, where the commodities are prepared for shipping and the area where the commodities are unloaded and prepared for treatment after being brought in from the fields. The treatment chamber forms a disinfestation airlock between the two areas so that only one end of the chamber can be open at a time. During the loading of the commodity bins into the chamber only the loading end doors 23 are opened and the opposite end doors 22 remain shut thus preventing insects from the commodities from getting into the insect-free zone. After treatment, when all the insects have been exterminated, only the unloading doors 22 to the chamber are open and the treated fruit is unloaded from the chamber into the insect-free zone and prepared for shipping. After treatment, the commodity is loaded into sealed containers to prevent reinfestation by insects during transportation of the commodity.

Figure 6:
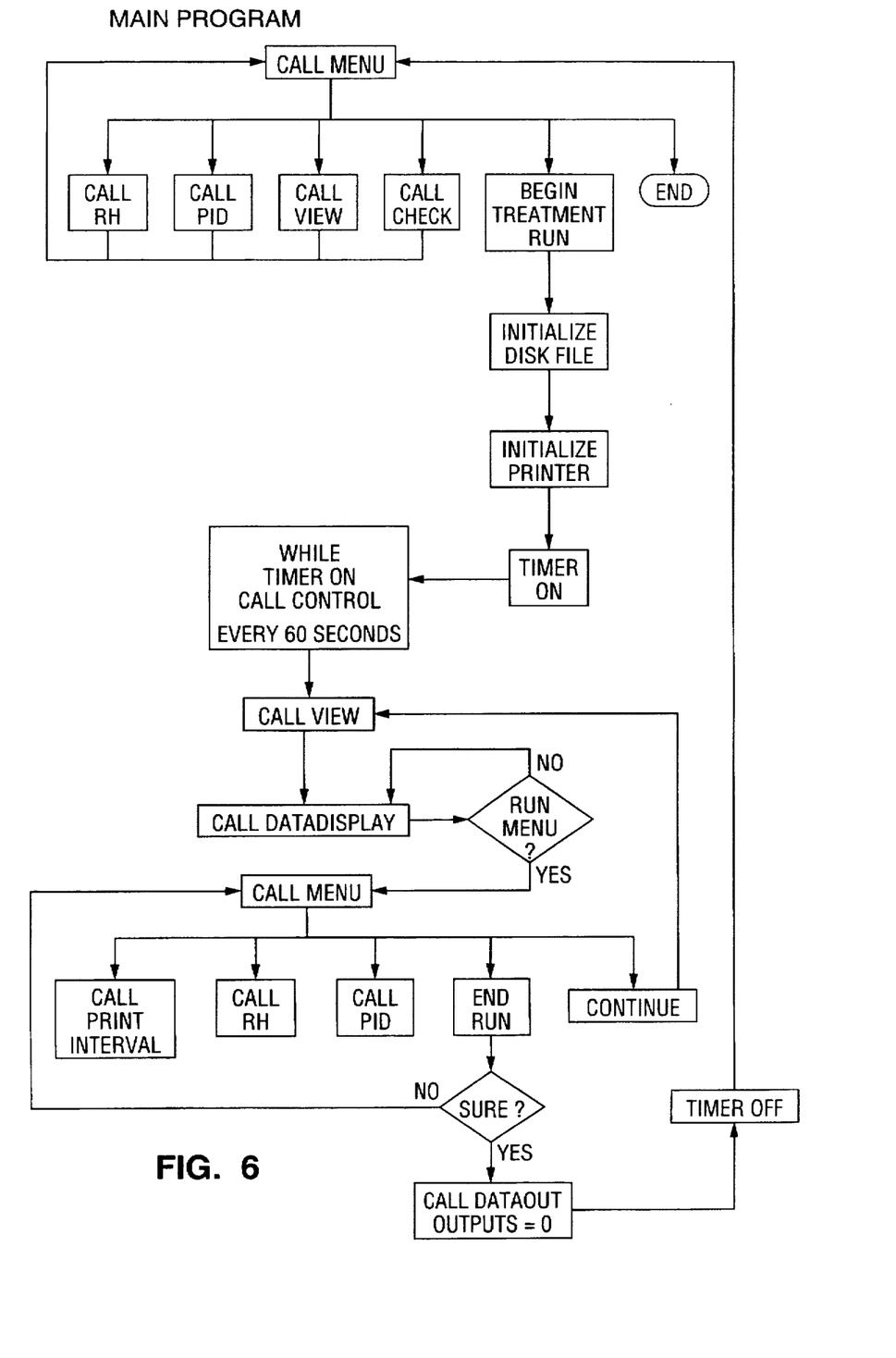
FIG. 6 illustrates the main program flowchart of the software used to control the treatment of commodities inside of the chamber.

The software used to control the treatment chamber of the present invention is illustrated in the flowcharts of FIGS. 6–15. FIG. 6 illustrates the flowchart of the main program used to control the treatment of commodities inside the chamber. The main program first calls the subroutine MENU, illustrated in FIG. 14, which displays a list of options available and allows a user to select an option from the list. As soon as the user has selected from the menu the software exits the subroutine MENU and calls the necessary subroutine according to the option chosen by the user.

Figure 7:
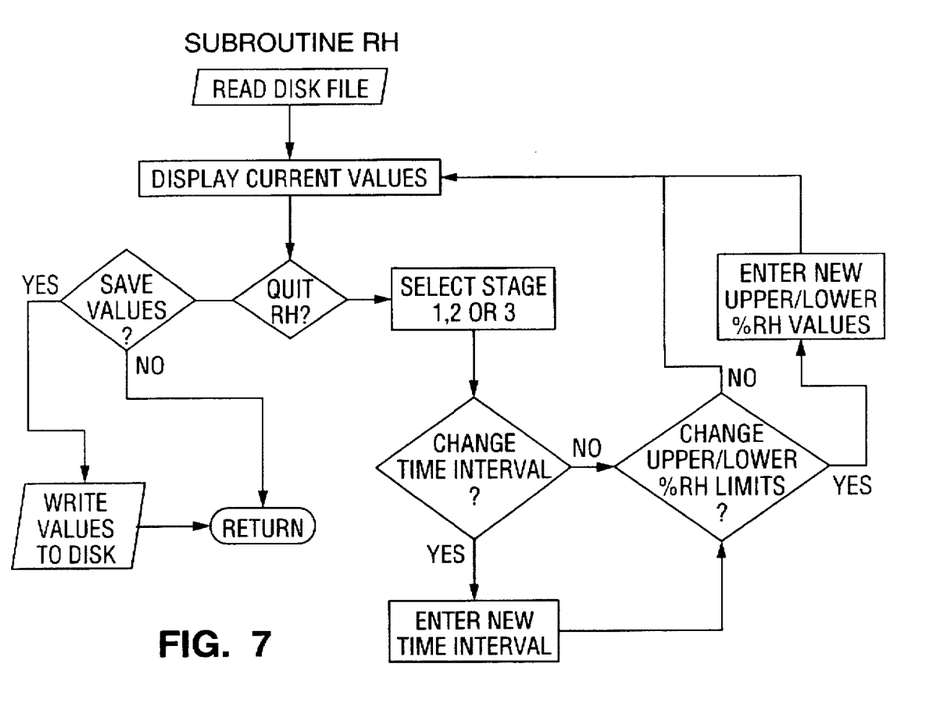
FIG. 7 illustrates the subroutine flowchart for the subroutine RH used to control the relative humidity inside the chamber.

If the user wants to change the relative humidity within the chamber during treatment, the subroutine RH, illustrated in FIG. 7, is called. The subroutine RH first looks up the current values stored for the relative humidity inside the chamber during treatment and displays those values. The software then asks the user whether the user wishes to change the values for relative humidity. If the user enters no, they do not want to change the values, then the values are saved and the subroutine MENU is called. If the user does want to change the humidity values then the software asks the user whether they wish to change the time interval. If the user wishes to change the time interval then the new time interval is entered and the user is then asked whether or not they wish to change the upper or lower relative humidity limits. If the user does not wish to change the time interval, they are immediately asked whether or not they wish to change the upper or lower relative humidity limits. If the user does wish to change the upper or lower relative humidity limits the new limits are entered. After the new limits are entered or if the user did not wish to change the upper or lower relative humidity limits, the current values are displayed and the user is again asked if they would like to change the relative humidity values. If the user enters no, they do not want to change the values, then the values are saved and the subroutine MENU is called. If the user enters yes, that they do want to change the values, then the process is duplicated.

Figure 8:
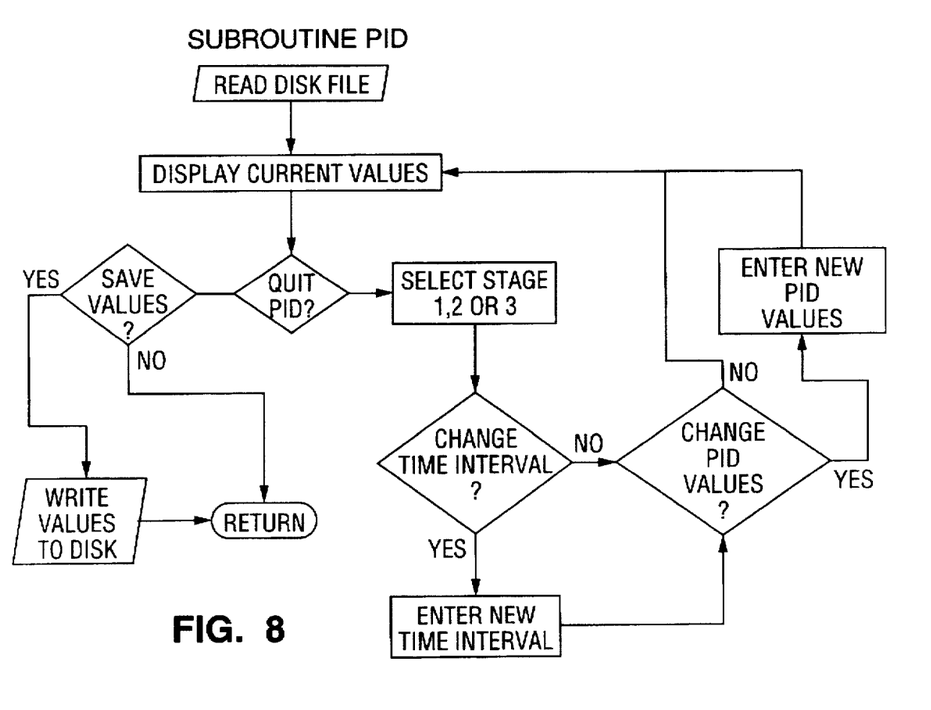
FIG. 8 illustrates the subroutine flowchart for the subroutine PID used to control the air temperature inside the chamber.

If the user wishes to change the time interval values to be used during treatment, the subroutine PID, illustrated in FIG. 8, is called. The current time interval and proportional integer values are looked up and displayed and the user is asked whether or not they wish to change the time interval values. If the user does not wish to change the time interval values or the proportional integer values, they are saved and the subroutine MENU is called. If the user does wish to change the values they are then asked whether they would like to change the time interval. If the user wishes to change the time interval then the new time interval is entered and the user is then asked whether or not they wish to change the proportional integer differential values. If the user does not wish to change the time interval they are immediately asked whether or not they wish to change the proportional integer differential values. If the user does wish to change the proportional integer differential values the new values are entered. After the new values are entered or if the user did not wish to change the proportional integer differential values, the current values are displayed and the user is again asked if they would like to change the values. If the user enters no, they do not want to change the values, then the values are saved and the subroutine MENU is called. If the user enters yes, that they do want to change the values, then the process is duplicated.

Figures 9, 10:
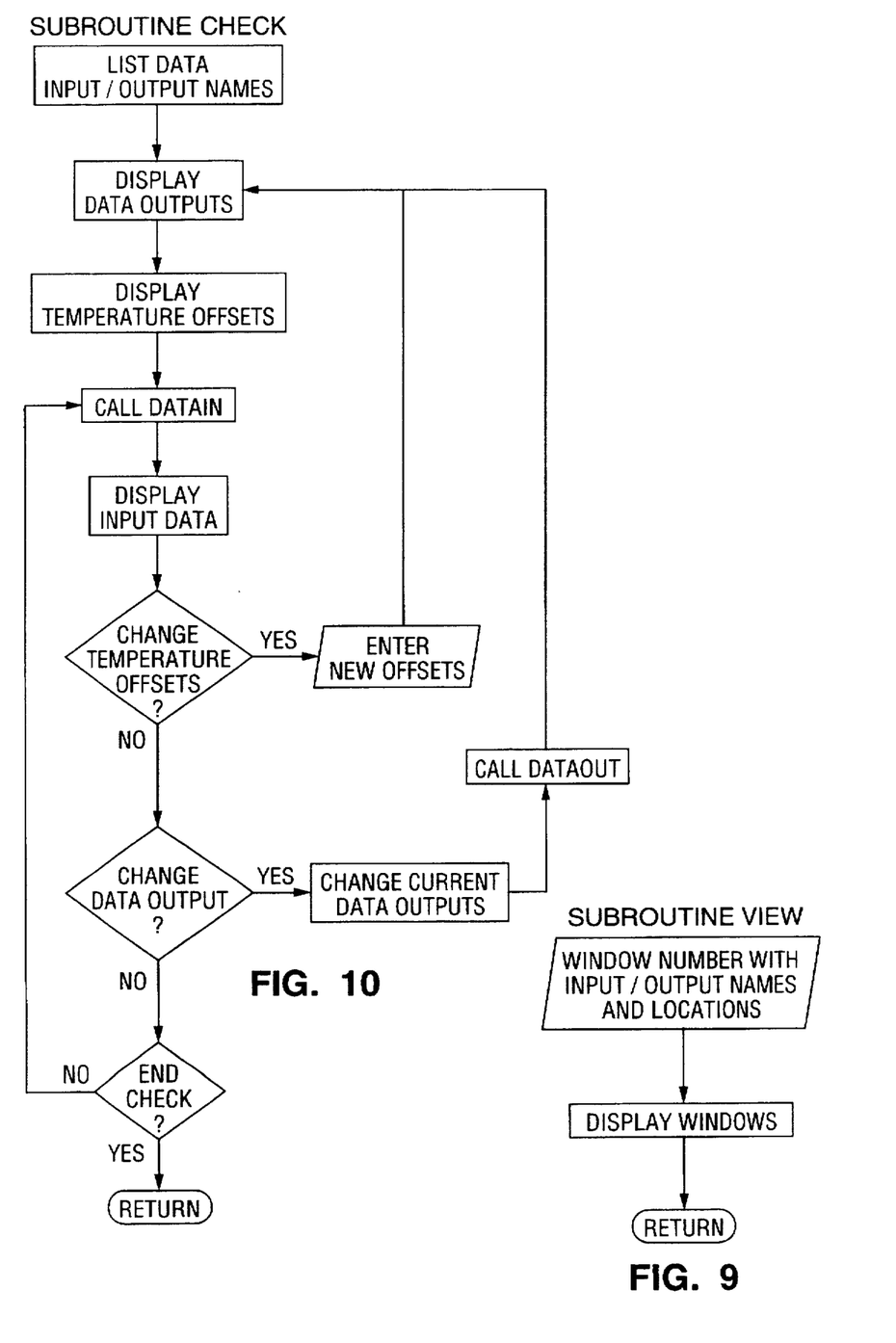
FIG. 9 illustrates the subroutine flowchart for the subroutine VIEW used to display the input/output names and locations.
FIG. 10 illustrates the subroutine flowchart for the subroutine CHECK used to change the temperature offsets and test the output channels.

If the user wishes to view the names and location of the inputs and outputs of the treatment chamber, the subroutine VIEW, illustrated in FIG. 9, is called. The names and locations of the inputs and outputs are displayed until the user enters a command to instruct the computer that the inputs and outputs do not need to be displayed any longer. Once the user enters the command to terminate the input/output display control is again returned to the subroutine MENU.

Figure 13:
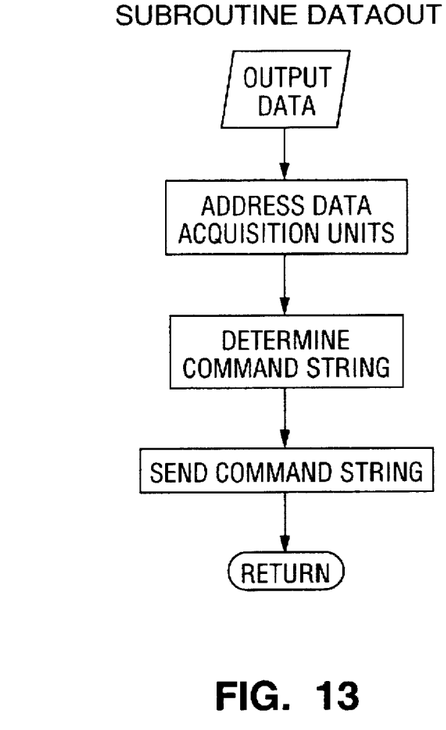
FIG. 13 illustrates the subroutine flowchart for the subroutine DATAOUT used to output the data to control channels.
Figure 14:
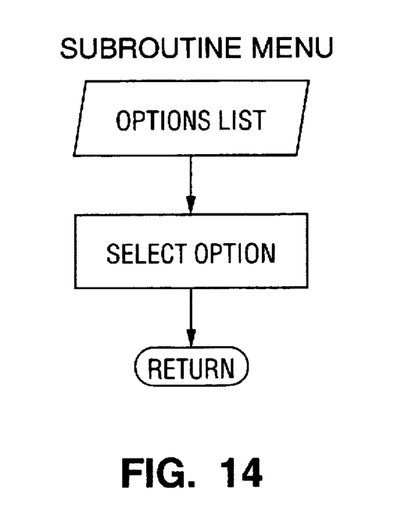
FIG. 14 illustrates the subroutine flowchart for the subroutine MENU used to display the main menu of the software to allow a user to select an option.
Figure 15:
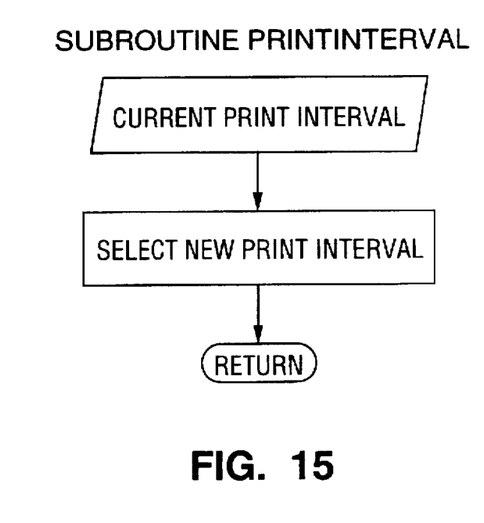
FIG. 15 illustrates the subroutine flowchart for the subroutine PRINTINTERVAL used to change the time interval that data is sent to a printer.

If the user wishes to change the inputs and outputs, the subroutine CHECK, illustrated in FIG. 10, is called. The subroutine CHECK first displays the data outputs and temperature offsets and then calls the subroutine DATAIN, illustrated in FIG. 12. The subroutine DATAIN monitors the temperature measured at the inputs and then returns control back to the subroutine CHECK. The temperature measured at the inputs is then displayed. The user is then asked if they wish to change the temperature offsets. If the user does wish to change the temperature offsets, the new offsets are entered and the subroutine goes back to the step where the data outputs were displayed. If the user did not wish to change the temperature offsets, they are then asked if they wish to change the data output. If the user does wish to change the data output, the current data outputs are changed and the subroutine DATAOUT, illustrated in FIG. 13, is called. The subroutine DATAOUT outputs the data and then returns back to the subroutine CHECK at the step where the data outputs are displayed. If the user did not wish to change the data output they are then asked if they still wish to change the inputs and outputs. If the user does still wish to change the inputs and outputs the subroutine DATAIN is called and the process, beginning at that step is repeated. If the user does not want to change the inputs and outputs the subroutine MENU is called.

Figure 11:
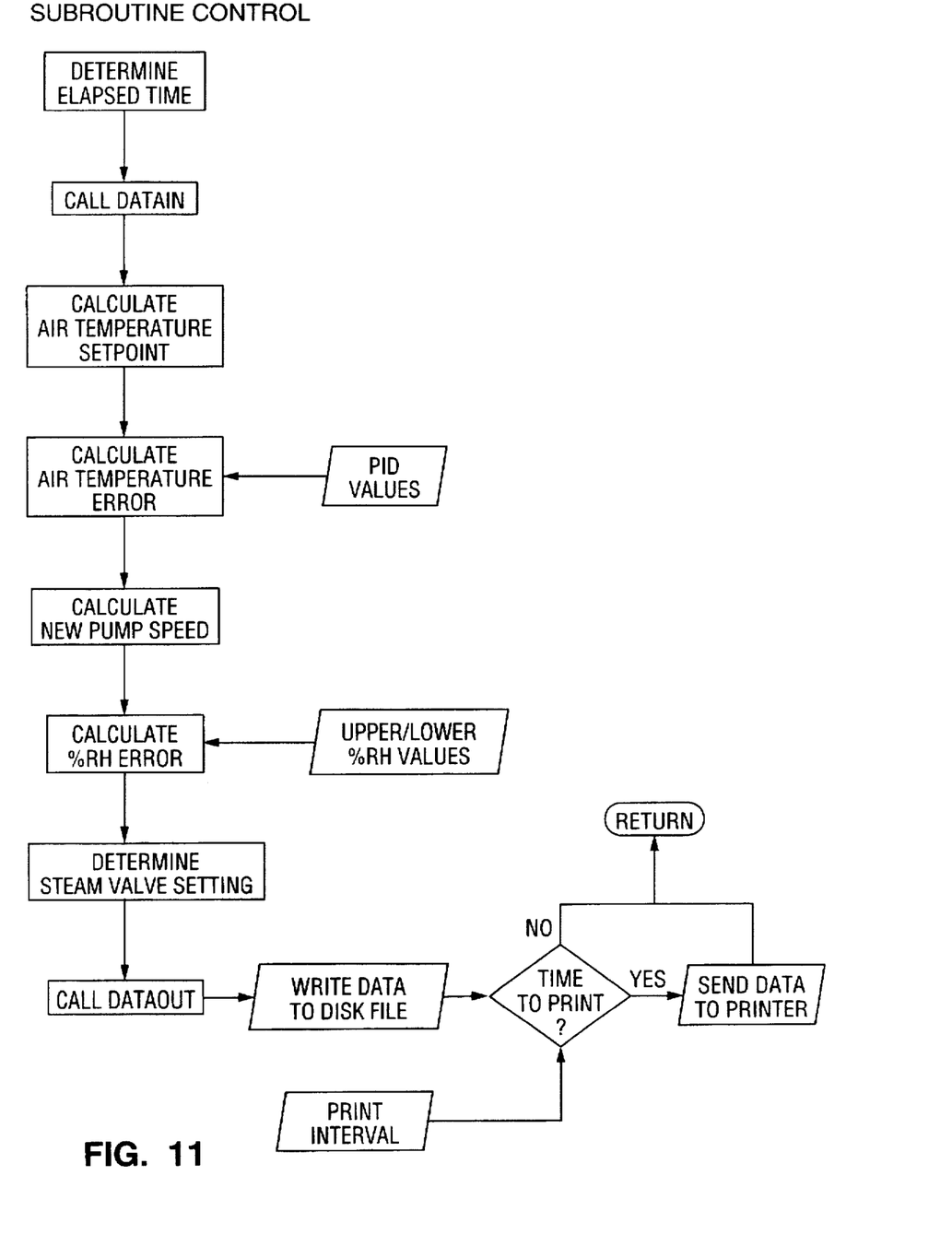
FIG. 11 illustrates the subroutine flowchart for the subroutine CONTROL used to control the operation of the heat exchanger during treatment of commodities inside of the chamber.
Figure 12:
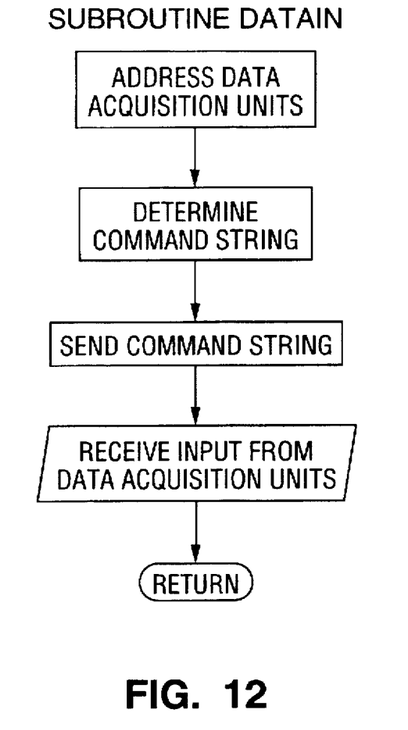
FIG. 12 illustrates the subroutine flowchart for the subroutine DATAIN used to obtain the data from the temperature probes.

If the user wishes to begin a treatment process within the chamber the disk file and printer are both initialized and the timer is turned on. While the timer is on the subroutine CONTROL, illustrated in FIG. 11, is called every 60 seconds. The subroutine CONTROL first determines the time that has elapsed and then calls the subroutine DATAIN which monitors the temperatures at the inputs and then returns back to the subroutine CONTROL. The air temperature setpoint is calculated and then the air temperature error, using the proportional integer differential values, is calculated. The new pump speed is calculated and then the relative humidity error is calculated, using the upper and lower relative humidity values. The steam valve setting is determined and the subroutine DATAOUT is then called. The subroutine DATAOUT outputs the data and then returns back to the subroutine CONTROL where the data is saved in a disk file and it is then determined if sufficient time has passed so that the data should be printed. If the data should be printed, the data is sent to the printer and control is sent back to the main program. If the data should not be printed then control is sent back to the main program immediately. Between sixty second intervals when the subroutine CONTROL is not being called, the main program calls the subroutine VIEW which displays the names and locations of the inputs and outputs. The data is then displayed and the user is asked if they would like to run the subroutine MENU, which will give them a list of options. If the user wishes to run the subroutine MENU all of the options discussed above will be available except the ability to view the data inputs and outputs and the ability to change the temperature offsets and the data outputs. In addition, the user is able to choose to change the print interval. The user is also able to end the treatment run. If the user would like to end the treatment run, the subroutine DATAOUT is called, the data is output, the timer is turned off and the subroutine MENU is called.

Once the treatment is done, a cooldown period is entered to allow the commodity to cool down inside the chamber before the end doors are opened. After the cooldown period is over the commodity bins are unloaded into the insect-free zone and the commodity is prepared for shipping.

It will be apparent to one of reasonable skill in the art that various modifications may be made to the preferred embodiment without departing from the spirit and scope of the invention as defined by the appended claims.

EXAMPLE 1

The following table is designed to show the difference in uniformity and temperature control between a treatment chamber of the prior art and the treatment chamber of the present invention. The differences in performance is illustrated in Table 1, which shows measured temperatures for a prior art chamber and for the present chamber during test runs. The prior art chamber includes the fan/heat exchanger assembly on the outside of the treatment chamber using a duct construction to blow the heated air into the treatment chamber. The bins in this chamber are stacked two high and the air flow is reversed every thirty minutes. The test on the prior art chamber was run on Jan. 7, 1993, until all of the monitored fruit had their fruit center temperatures raised to 47.2° C. When the last temperature probe, inside a fruit center, reached 47.2° C., the cooling water was turned on immediately and the temperatures of all the probes recorded. Thirty six probes were used to measure the temperature inside of the prior art chamber. These temperatures for the probes are listed in the table and the mean and standard deviation are included at the bottom of the table. The temperatures measured at the end of heating ranged from 47.6° C. to 49.3° C., with the mean temperature equal to 48.43° C., a range of temperatures from 47.63° C. to 49.32° C. and a variance in temperatures of 1.69° C.

The treatment chamber in the present invention was tested on Sep. 15, 1993 in exactly the same way as the prior art chamber was tested, except that forty probes were used to measure temperature. Once all of the temperature probes had reached the temperature of 47.2° C., the cooling water was turned on and the temperatures of all the probes recorded. The temperatures of these probes are listed in a side-by-side comparison to the measurements taken in the test of the prior art chamber to illustrate the greater uniformity of the treatment chamber of the present invention to the chamber of the prior art. The temperatures in the test of the chamber of the present invention ranged from 47.2° C. to 48.7° C., with the mean temperature equal to 48.06° C., a range of temperatures from 47.2° C. to 48.7° C. and a variance in temperatures of 1.5° C. Thus, the temperature distribution of the probes in the chamber of the present invention was less likely to exceed the potential damage temperature to the extent that the probes of the prior art chamber did. In fact, only one probe exceeded the potential damage temperature of 48.5° C. in the test of the present invention. While there was only a difference of 0.37° C. between the mean values of the two tests, that difference is very great in the narrow temperature range within which the treatment chamber must be operated in.

TABLE 1

| Probe # | Prior Art Chamber Tested 1/7/93 Temp. °C. | Chamber of Present Invention Tested 9/15/93 Temp. °C. |
|---|---|---|
| 1 | 47.81 | 47.9 |
| 2 | 48.57 | 47.2 |
| 3 | 48.48 | 47.6 |
| 4 | 48.44 | 47.5 |
| 5 | 48.08 | 48.0 |
| 6 | 48.19 | 48.2 |
| 7 | 47.63 | 48.4 |
| 8 | 48.38 | 48.2 |
| 9 | 49.32 | 48.3 |
| 10 | 48.33 | 48.4 |
| 11 | 48.38 | 47.8 |
| 12 | 48.41 | 48.5 |
| 13 | 48.62 | 48.2 |
| 14 | 48.49 | 48.3 |
| 15 | 48.35 | 48.2 |
| 16 | 48.53 | 48.3 |
| 17 | 48.83 | 48.2 |
| 18 | 48.16 | 48.1 |
| 19 | 48.77 | 47.9 |
| 20 | 48.52 | 48.3 |
| 21 | 48.67 | 47.7 |
| 22 | 48.47 | 47.9 |
| 23 | 48.41 | 47.9 |
| 24 | 48.51 | 48.0 |
| 25 | 48.75 | 48.0 |
| 26 | 48.36 | 48.3 |
| 27 | 49.16 | 47.8 |
| 28 | 48.08 | 47.6 |
| 29 | 48.44 | 48.0 |
| 30 | 48.23 | 47.6 |
| 31 | 48.42 | 47.9 |
| 32 | 48.12 | 47.7 |
| 33 | 48.29 | 48.0 |
| 34 | 48.55 | 48.2 |
| 35 | 48.24 | 47.9 |
| 36 | 48.52 | 48.7 |
| 37 |  | 48.4 |
| 38 |  | 48.3 |
| 39 |  | 48.5 |
| 40 |  | 48.5 |
| Mean: | 48.43 | 48.06 |
| Range: | 47.63–49.32 | 47.2–48.7 |
| Variance: | 1.69 | 1.5 |

We claim:

1. A treatment method for disinfesting a fruit, flower or vegetable commodity, comprising the steps of:

a. providing: i) a high-temperature forced-air disinfestation device, comprising A) a single chamber comprising side walls and openings at opposing ends and B) a conveyer track system extending the length of said chamber between said openings and sealingly engaging with said side walls of said chamber; ii) a plurality of commodity bins containing said commodity and disposed along said conveyer track system so as to divide said single chamber into upper and lower plenums; and iii) means for heating and circulating air between said plenums, said means for heating and circulating mounted in the center of said single chamber directly below said conveyer track system supporting said commodity bins;

b. heating said commodity inside of said commodity bins with air under conditions that the temperature of the center of said commodity is raised to the thermal death point temperature for a target pest; and c. unloading the plurality of bins from disinfestation device using the conveyor track system.

2. The treatment method of claim 1, wherein said means for heating and circulating air comprises an axial fan and heat exchanger.

3. The treatment method of claim 1, wherein said means for heating and circulating air comprises a reversible fan and heat exchanger.

4. The treatment method of claim 1, wherein said conveyer track system is motorized and comprises two parallel bin tracks mounted to said side walls of said chamber and a drive means for moving said commodity bins along said bin tracks.

5. The treatment method of claim 4, wherein said drive means comprises two chain loops, a push rod, a plurality of idler sprockets, two drive sprockets, a drive shaft and a gear reduction motor.

6. The treatment method of claim 4, wherein said motorized conveyer track system further comprises two fan sealing plates to prevent said commodity bins from blocking the space above said means for heating and circulating air.

7. The treatment method of claim 4, further comprising a plurality of temperature probes inserted into said commodity within s commodity bins, said probes and said heating and circulating means further coupled with a control means to automatically adjust the temperature within said chamber.

8. The treatment method of claim 7, wherein said temperature probes are inserted into said commodity located at predetermined cold spots within said chamber.

\* \* \* \* \*